(12) United States Patent
Reghunath et al.

(10) Patent No.: US 11,436,171 B2
(45) Date of Patent: *Sep. 6, 2022

(54) SHARED BUFFER FOR MULTI-OUTPUT DISPLAY SYSTEMS

(71) Applicant: Texas Instruments Incorporated, Dallas, TX (US)

(72) Inventors: Anish Reghunath, Allen, TX (US); Brian Chae, Duluth, GA (US); Jay Scott Salinger, Framingham, MA (US); Chunheng Luo, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/704,820

(22) Filed: Dec. 5, 2019

(65) Prior Publication Data
US 2020/0210360 A1 Jul. 2, 2020

Related U.S. Application Data

(63) Continuation of application No. 16/237,388, filed on Dec. 31, 2018, now Pat. No. 10,534,736.

(51) Int. Cl.
*G06F 12/02* (2006.01)
*G06F 13/28* (2006.01)
*G06F 12/1081* (2016.01)
*G06F 3/14* (2006.01)

(52) U.S. Cl.
CPC .............. *G06F 13/28* (2013.01); *G06F 3/14* (2013.01); *G06F 12/1081* (2013.01)

(58) Field of Classification Search
CPC ....... G06F 15/00; G06F 13/28; G06F 12/1081
See application file for complete search history.

(56) References Cited

U.S. PATENT DOCUMENTS

| | | | | |
|---|---|---|---|---|
| 5,586,264 | A | * 12/1996 | Belknap | ................ G06F 3/0601 725/115 |
| 5,805,821 | A | * 9/1998 | Saxena | ................... H04N 21/21 709/213 |
| 6,430,580 | B1 | 8/2002 | Azagury et al. | |
| 6,760,851 | B2 | 7/2004 | Teshima et al. | |
| 6,826,583 | B1 | 11/2004 | Flood et al. | |

(Continued)

FOREIGN PATENT DOCUMENTS

EP 0979377 A1 * 2/2000 ............ F26B 17/106

*Primary Examiner* — Cheng Yuan Tseng
(74) *Attorney, Agent, or Firm* — Charles F. Koch; Charles A. Brill; Frank D. Cimino

(57) ABSTRACT

A system includes a display subsystem. The display subsystem includes a shared buffer having allocated portions, each allocated to one of a plurality of display threads, each display thread associated with a display peripheral. The display subsystem also includes a direct memory access (DMA) engine configured to receive a request from a main processor to deallocate an amount of space from a first allocated portion associated with a first display thread. In response to receiving the request, the DMA engine deallocates the amount of space from the first allocated portion and shifts the allocated portions of at least some of other display threads to maintain contiguity of the allocated portions and concatenate free space at an end of the shared buffer.

20 Claims, 5 Drawing Sheets

(56) References Cited

U.S. PATENT DOCUMENTS

| | | | |
|---|---|---|---|
| 7,010,555 B2* | 3/2006 | Blandy | G06F 12/0269 |
| | | | 711/170 |
| 7,460,126 B2* | 12/2008 | Grantham | G06F 3/1446 |
| | | | 345/502 |
| 7,716,249 B2* | 5/2010 | Harris | G06F 9/524 |
| | | | 707/796 |
| 7,716,258 B2* | 5/2010 | Dussud | G06F 12/0269 |
| | | | 707/813 |
| 8,244,969 B2 | 8/2012 | McWilliams et al. | |
| 8,436,771 B2 | 5/2013 | Singh et al. | |
| 8,578,068 B2* | 11/2013 | Blocksome | G06F 13/28 |
| | | | 709/212 |
| 8,581,780 B2 | 11/2013 | Singh et al. | |
| 9,026,745 B2* | 5/2015 | Bouge | G06F 9/5016 |
| | | | 711/147 |
| 9,378,059 B2 | 6/2016 | Huetter et al. | |
| 9,921,845 B2 | 3/2018 | Abdullah | |
| 9,990,200 B2 | 6/2018 | Abdullah | |
| 9,990,299 B2 | 6/2018 | Lin | |
| 9,992,264 B2* | 6/2018 | Wilding | H04L 47/622 |
| 10,185,560 B2 | 1/2019 | Vasilyev et al. | |
| 10,282,296 B2* | 5/2019 | Brandt | G06F 12/1009 |
| 10,496,448 B2* | 12/2019 | Surti | G06F 9/5088 |
| 10,747,444 B2* | 8/2020 | Matsuyama | G06F 3/0611 |
| 11,061,676 B2* | 7/2021 | Jacob | G06F 12/0806 |
| 11,132,294 B2* | 9/2021 | Nilsen | G06F 9/5005 |
| 2006/0242635 A1* | 10/2006 | Broussard | G06F 9/45504 |
| | | | 717/151 |
| 2012/0060161 A1* | 3/2012 | Jou | G06F 9/5038 |
| | | | 718/102 |

* cited by examiner

200

| RESOLUTION | FORMAT | 1-LINE (IN KB) | 8-LINES (IN KB) |
|---|---|---|---|
| 1280 (HD) | ARGB32 (32bpp) | 5 | 40 |
| | RGB24p (24bpp) | 3.75 | 30 |
| | YUV422 (16bpp) | 2.5 | 20 |
| | YUV420 (16bpp) | 2.5 | 20 |
| | | | |
| 1920 (1080p) | ARGB32 (32bpp) | 7.5 | 60 |
| | RGB24p (24bpp) | 5.625 | 45 |
| | YUV422 (16bpp) | 3.75 | 30 |
| | YUV420 (16bpp) | 3.75 | 30 |
| | | | |
| 2560 (2.5K) | ARGB32 (32bpp) | 10 | 80 |
| | RGB24p (24bpp) | 7.5 | 60 |
| | YUV422 (16bpp) | 5 | 40 |
| | YUV420 (16bpp) | 5 | 40 |
| | | | |
| 4096 (4K) | ARGB32 (32bpp) | 16 | 128 |
| | RGB24p (24bpp) | 12 | 96 |
| | YUV422 (16bpp) | 8 | 64 |
| | YUV420 (16bpp) | 8 | 64 |

FIG. 2

SHARED BUFFER FOR MULTI-OUTPUT DISPLAY SYSTEMS

CROSS-REFERENCE TO RELATED APPLICATIONS

This application is a continuation application of U.S. patent application Ser. No. 16/237,388 filed on Dec. 31, 2018, which is hereby incorporated herein in its entirety.

SUMMARY

In accordance with at least one example of the disclosure, a system includes a display subsystem. The display subsystem includes a shared buffer having allocated portions, each allocated to one of a plurality of display threads, each display thread associated with a display peripheral. The display subsystem also includes a direct memory access (DMA) engine configured to receive a request from a main processor to deallocate an amount of space from a first allocated portion associated with a first display thread. In response to receiving the request, the DMA engine deallocates the amount of space from the first allocated portion and shifts the allocated portions of at least some of other display threads to maintain contiguity of the allocated portions and concatenate free space at an end of the shared buffer.

In accordance with another example of the disclosure, a method includes receiving a request from a main processor to deallocate an amount of space from a first allocated portion of a shared buffer associated with a first display thread. Each allocated portion of the shared buffer is allocated to one of a plurality of display threads and each display thread associated with a display peripheral. In response to receiving the request to deallocate, the method includes deallocating the amount of space from the first allocated portion and shifting the allocated portions of at least some of other display threads to maintain contiguity of the allocated portions and concatenate free space at an end of the shared buffer.

BRIEF DESCRIPTION OF THE DRAWINGS

For a detailed description of various examples, reference will now be made to the accompanying drawings in which:

FIG. 2 shows an exemplary table of buffer requirements for various video resolutions, formats, and access and use patterns in accordance with various examples;

DETAILED DESCRIPTION

Figure 1:
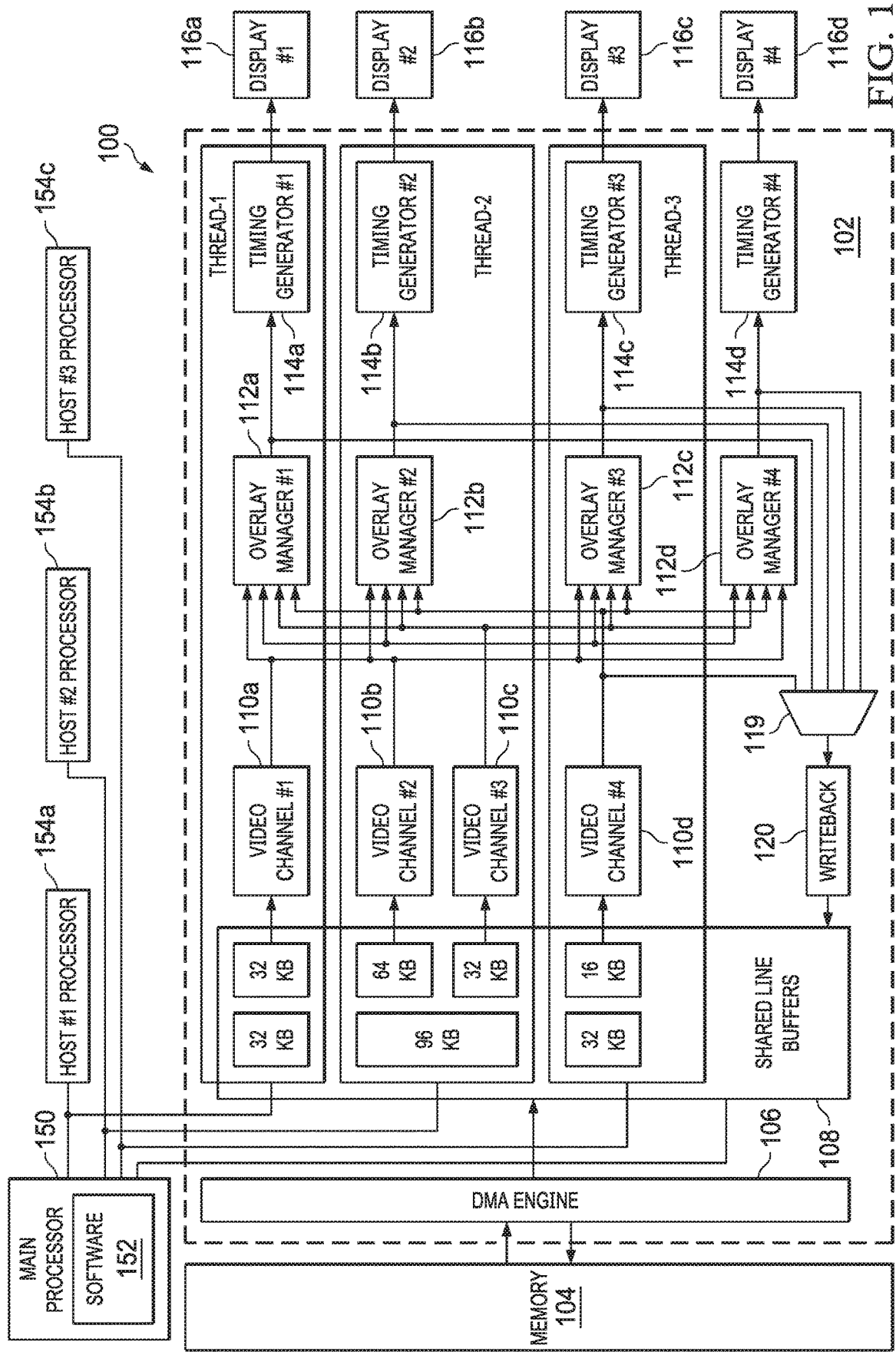
FIG. 1 shows a block diagram of a system in accordance with various examples.

The proliferation of multi-display systems having increased display resolutions and frame rates presents challenges to effectively and efficiently controlling the various displays. For example, in an automotive application, a single display subsystem may be responsible for displaying different content on multiple display peripherals, such as an instrumentation cluster display, a passenger monitor, and rear-seat entertainment displays. The display subsystem fetches display content data from memory for each of the display peripherals, performs processing (e.g., color space conversion, video format conversion, resizing) and composition functions on the content data to generate display frames, and transmits the frames to the proper display peripheral for viewing by one or more users.

Reducing or minimizing the latency of the display subsystem is important, particularly where some display content is safety critical (e.g., instrumentation cluster data, a live feed from one or more exterior cameras). To address the latency issue, a display subsystem performs the aforementioned processing and composition functions in an inline manner. A non-inline alternative includes first processing/compositing a display frame, writing the display frame back to memory, and then fetching the display frame for display. Although the inline display subsystem approach reduces latency, this approach also increases local buffering requirements relative to the non-inline approach to ensure sufficient data is available to be processed into a display frame. Put another way, an insufficiently sized local buffer results in dropped frames when using an inline display subsystem. Further, buffering requirements increase as a function of screen resolution; however, it is inefficient to allocate exclusively for each display a buffer of sufficient size to handle a maximum presently-available resolution. Higher resolution display formats developed in the future also not be supportable due to insufficient buffer size.

Examples of this disclosure address the foregoing problems by providing an inline display subsystem and methods in which space in a shared local buffer is dynamically allocated to multiple display threads, and to multiple channels within a display thread. A channel corresponds to a single source of display data, while a thread refers to the one or more channels associated with a particular display device.

A main processor executes supervisory software (e.g., a hypervisor), while one or more host processors are coupled to the main processor. The host processors generate content for eventual display on one or more of the display peripherals. A host processor requests to the main processor to increase or decrease a size of the shared buffer allocated to a thread or channel associated with the host processor, and the host processor increases or decreases a size of the shared buffer allocated to a channel associated with the host processor on its own.

The supervisory software that controls the overall display subsystem determines that a reallocation should take place, for example because a particular thread's resolution is increasing (or could be increased) and another thread is either not making use of its entire allocated buffer space, or is able to have its allocated buffer space decreased (e.g., due to a decrease in resolution of the second thread). Similarly, in some examples, the supervisory software or the host processor managing its associated thread determines that a reallocation should take place because within a thread, a particular channel's resolution is increasing (or could be increased) and another channel in the same thread is either not making use of its entire allocated buffer space, or could have its allocated buffer space decreased (e.g., due to a decrease in resolution of the second channel). In some examples, the reallocation of additional space to a particular channel occurs because there is unused space allocated for the thread that the channel is associated with.

The supervisory software (or host processor in the case of a channel reallocation) sends a command to the display subsystem to decrease the second thread's (or channel's) allocated buffer space by a certain amount. The display subsystem hardware then carries out the deallocation command at a "sync event" for the thread or the channel (e.g., at the end of a frame being displayed). Once the deallocation is complete, the display subsystem generates an indication to inform the supervisory software, for example by generating an interrupt or updating a thread size status register accessible by the main processor. Subsequently, the supervisory software issues an allocation command to allocate a certain amount of buffer space to the first thread (or first channel). Again, the display subsystem hardware carries out the allocation command at a sync event for the thread or the channel.

FIG. 1 depicts a block diagram of a system 100 in accordance with examples of this disclosure. The system 100 includes a display subsystem 102, which is coupled to a memory 104, for example by way of a double data rate (DDR) bus. The display subsystem 102 includes a buffer (e.g., a memory) and configurable hardware blocks to carry out various functions, which are explained further below. The configurable hardware blocks may include one or more programmable registers that control the functionality of the various hardware blocks. The display subsystem 102 facilitates an interface between the memory 104 and one or more display peripherals 116a-116d. The display peripherals 116a-116d include various monitors, remote displays, instrumentation clusters, and the like.

The memory 104 contains various display content data, such as graphics content generated by a graphics processing unit (GPU), content captured by one or more cameras, and the like. Regardless of the source of the content, the memory 104 serves as a repository for such content prior to its processing and eventual display on the display peripherals. As explained above, one example application is in the automotive space, where the display peripherals 116a-116d include the instrumentation cluster, a passenger monitor, and/or rear-seat entertainment screens. In this example, the display content data includes instrumentation data (e.g., a digital speedometer, tachometer, fuel gauge, and other information related to vehicle operations), navigation data, and other entertainment/media data.

The display subsystem 102 also includes a direct memory access (DMA) engine 106, which fetches display content data from the memory 104. The DMA engine 106 also facilitates a write-back (e.g., of a fully processed and composed display frame) of data to the memory 104. The DMA engine 106 provides display content data from the memory 104 to a shared buffer 108. As will be discussed further below, the shared buffer 108 is a local buffer to the display subsystem 102, which ensures that enough display content data is available for processing to provide a full display frame to the display peripherals 116a-116d, which is beneficial for applications where inline processing is utilized (as shown) to reduce latency (e.g., automotive applications where one or more of the display peripherals displays safety-critical content).

A plurality of video channels 110a-110d access display content data stored in the shared buffer 108. Each video channel 110a-110d corresponds to a window to be displayed on one of the display peripherals 116a-116d. The video channels 110a-110d perform processing (e.g., color space conversion, video format conversion, resizing) to generate processed display content data. Each video channel 110a-110d is configured to provide its processed display content data to a plurality of overlay managers 112a-112d.

The overlay managers 112a-112d perform composition functions on the display content data from one or more of the video channels 110a-110d to create a display frame. In the example of FIG. 1, the overlay manager 112b combines processed display content data from video channels 110b and 110c and creates a display frame including both of those video channels' data for display on the display peripheral 116b. For example, one video channel 110b corresponds to an internet browser application while the other video channel 110c corresponds to normal operating system graphics. In this case, the overlay manager 112b combines these two display streams into a single display frame. The overlay managers 112a and 112c take the processed display content data from video channels 110a and 110d, respectively, and create a display frame.

The display peripherals 116a-116d are asynchronous in some examples. For example, one display peripheral 116a includes a 60 frames per second (fps) 1080p display, while another display 116b includes a 60 fps 4 K display, while yet another display peripheral 116c and 116d includes a 30 fps 1080p display. To address these timing differences, each overlay manager 112a-112d provides its display frame output to one of timing generators 114a-114d, respectively. The timing generators 114a-114d creates an output of display frames tailored to its associated display peripheral 116a-116d. For example, the display peripherals 116a and 116b are 60 fps displays, and thus the timing generator 114a and 114b provide display frames at a rate of 60 fps. On the other hand, the display peripherals 116c and 116d are 30 fps displays, and thus the timing generators 114c and 114d provide display frames at a rate of 30 fps. In particular, in an example, according to the display rate and resolution, the timing generators 114a-114d slow down the data transfer from the respective overlay manager 112a-112d, which in turn slows down the data transfer from the respective video channel 110a-110d, which slows down the DMA engine 106 access.

In some examples, the display subsystem 102 also includes a write-back pipeline 120, which receives display frame content from the overlay managers 112a-112d and in this example the video channel 110d. A multiplexer 119 selects which of the overlay managers 112a-112d and the video channel 110d is provided to the write-back pipeline 120. The write-back pipeline 120 receives the input from multiplexer 119 and facilitates encoding a final output (e.g., a composite display frame from the overlay managers 112a-112d) and writing that output back to the memory 104 via the shared buffer 108 and the DMA engine 106. For example, certain display frames are desired to be displayed remotely as well, and thus in addition to being sent to one of the display peripherals 116a-116d, are also written-back into the memory 104, for subsequent transmission to a remote display (not shown for brevity). In another example, a format conversion is performed (e.g., a video frame in memory 104 is in an RGB format but is desired to be converted to a YUV format) by fetching the frame to be converted, and performing the conversion, by video channel 110d. The converted frame is then written back to the memory 104 from the video channel 110d via the write-back pipeline 120. In other examples, multiple of the video channels 110a-110d are coupled to the write-back pipeline 120.

The system 100 also includes a main processor 150 on which supervisory software 152 (e.g., a hypervisor) is executed. In an example, one or more host processors 154a-154c are coupled to the main processor 150.

In an example, the main processor 150 and the host processors 154a-154c are different, physically separate processors. In this example, the main processor 150 is a safety-critical processor, while the host processors 154a-154c are general purpose processors.

In another example, the main processor 150 and the host processors 154a-154c are separate processes or virtual machines all running on a single processor. In this example, the main processor 150 is a higher level process (e.g., a hypervisor or supervisor) while the host processors 154a-154c are controlled by the main processor 150.

In yet another example, the main processor 150 is a safety-critical processor, while the host processors 154a-154c are virtual machines running on a single general purpose processor.

Regardless of configuration, the host processors 154a-154c generate content for eventual display on one or more of the display peripherals 116a-116d, which is stored in the memory 104 for subsequent access by the display subsystem 102. In an example, the host processors 154a-154c request to the main processor 150 to increase or decrease a size of the shared buffer 108 allocated to a thread or channel associated with the host processor 154a-154c. In another example, the host processors 154a-c directly cause increase or decrease a size of the shared buffer 108 allocated to a channel associated with the host processor 154a-154c. The main processor 150 and/or the supervisory software 152 executed by the main processor handles such allocation and de-allocation requests through communication with the DMA engine 106, which will be explained in further detail below. The main processor 150 and/or the supervisory software 152 oversee and may override requests by host processors 154a-154c to allocate or deallocate space across channels and threads, for example to avoid a deadlock situation in which host processors 154a-154c compete for a particular amount of space. For example, if a host processor 154a requests additional space in the shared buffer 108 for its associated thread but no other host processor 154b-154c can have its space deallocated and there is not free space in the shared buffer 108, the main processor 150 and/or the supervisory software 152 do not carry out the request.

As explained above, the display subsystem 102 operates in an inline manner. That is, aside from certain situations in which the write-back pipeline 120 is utilized (for example to display remotely), display content data is read from the memory 104 and, after the processing by the video channels 110a-110d and composition by the overlay managers 112a-112d explained above, is displayed on one of the display peripherals 116a-116d. Such inline operation results in low latency, which is beneficial, particularly in safety-critical applications such as automotive applications; however, inline operation imposes additional buffering requirements in order to ensure sufficient data is locally available to the display subsystem 102 to create a complete display frame at a time.

Several factors influence size requirements for the shared buffer 108. For example, the display content data is encoded in the memory 104 at varying native resolutions and using different compression schemes, which influences the amount of space in memory 104 taken up by one line of pixels. Further, the particular data fetch pattern, or how the DMA engine 106 accesses display content data from the memory 104, can influence the number of lines of pixel data to be stored in the shared buffer 108 for a given channel at a given time. Additionally, the particular data consumption pattern, or how the video channels 110a-110d consume display content data from the shared buffer 108, can also influence the number of lines of pixel data to be stored in the shared buffer 108 for a given channel at a given time.

For example, using a raster fetch pattern, pixels are fetched one line at a time. Thus, in this case the space in the shared buffer 108 for a given video channel 110a-110d should be sufficient to compensate for the round trip latency in accessing the memory 104 as well as any other system bottlenecks (e.g., caused by other initiators such as a central processing unit (CPU) or the GPU accessing the memory 104 at the same time as the display subsystem 102). In an example, one line of storage in the shared buffer 108 for a given video channel 110a-110d is sufficient for a particular use case. The buffer size requirements provided herein are exemplary and may be determined on a system-by-system basis so that the buffer does not become empty when the fetch rate from the memory 104 is slower (e.g., due to competing accesses from a CPU, GPU, and the like).

In another example, using a tile fetch pattern, pixels are fetched as a "tile" where the tile spans across four lines of pixels. In this case, the shared buffer 108 is used in a "ping-pong" mode to access the memory 104. For example, the DMA engine 106 fetches a first set of four lines (as tiles) and stores in the shared buffer 108, occupying four lines of storage. The DMA engine 106 then fetches a second set of four lines (as tiles), but it cannot replace the first set of four lines because the first set of four lines are still being processed by the video channel 110a-110d (e.g., one line at a time). Thus, an additional four lines of storage in the shared buffer 108 are required for the second set of four lines. The DMA engine 106 fetches a third set of four lines once the first set of four lines is completely processed by the video channel 110a-110d, and thus the third set replaces the first set in the shared buffer 108. As a result, the space in the shared buffer 108 for a given video channel 110a-110d should be at least sufficient to store eight full lines.

Regarding consumption patterns, using a raster consumption pattern, the shared buffer 108 provides one line at a time to a given video channel 110a-110d. As above with the raster fetch pattern, the space in the shared buffer 108 for a given video channel 110a-110d should be sufficient to compensate for the round trip latency in accessing the memory 104 as well as any other system bottlenecks, which is typically one line of storage.

In another example, using a scalar mode consumption pattern, the shared buffer 108 should be able to send multiple lines in parallel to a given video channel 110a-110d. For example, if the given video channel 110a-110d is vertically downscaling the video by four times, then the shared buffer 108 needs to be able to supply the given video channel 110a-110d with four lines at a time. Again, the shared buffer 108 is used in "ping-pong" mode as explained above, and thus at least eight lines of storage are needed.

FIG. 2 shows a table 200 that demonstrates the varying shared buffer 108 size requirements in KB for a given channel depending on display content data native resolution, compression scheme or format, and number of lines (e.g., 1 or 8), which is dictated by the fetch and consumption patterns as explained above. To demonstrate the large possible variation in shared buffer 108 storage requirements, the amount of shared buffer 108 space required for a given channel for highly-compressed HD native data using fetch and consumption schemes that require only 1 line at a time be stored in the shared buffer 108 is approximately 2.5 KB. On the other hand, the amount of shared buffer 108 space required for a given channel for a relatively less-compressed 4 K native data using fetch and consumption schemes that require 8 lines at a time be stored in the shared buffer 108 is approximately 128 KB.

One possible solution is to allocate to each video channel 110a-110d an independent buffer of the maximum size that could be required (e.g., 128 KB). However, to do so may waste die area since, in many cases, a particular video channel 110a-110d either does not need to display at full 4 K resolution, or does not have full 4 K resolution data available to it. Further, allocating fixed buffer space to each video channel 110a-110d is inefficient, for example when one video channel 110a-110d requires increased buffer space based on content and display type, while other video channels 110a-110d do not.

Examples of the present disclosure are directed to a shared buffer scheme where buffer space is dynamically allocated and de-allocated on a per-thread and/or per-channel basis. Referring back to FIG. 1 and in accordance with examples of this disclosure, the DMA engine 106 is configured to dynamically allocate memory in the shared buffer 108 to multiple threads, and in some cases to multiple video channels 110a-110d within a thread. As explained above, for the purposes of this disclosure, each overlay manager 112a-112d of the display subsystem 102 constitutes a thread. All video channels 110a-110d that provide processed display content data to a particular overlay manager 112a-112c are part of the same thread, and share the memory allocated in the shared buffer 108 to that particular thread. While the video channels 110a-110d are configured to provide processed display content data to any of the overlay managers 112a-112d, in the example of FIG. 1 the provision of processed display content data is demonstrated by the boxes corresponding to Threads 1-3. Although not shown in FIG. 1 for simplicity, a fourth thread is associated with the overlay manager 112d, although in this example since no video channel is coupled to the overlay manager 112d, the display peripheral 116d does not display any content.

In the example of FIG. 1, Thread 1 corresponds to the overlay manager 112a and display peripheral 116a, and includes the video channel 110a. Thread 1 is shown as being allocated 32 KB of the shared buffer 108 (demonstrated by the left-most memory block in the shared buffer 108 corresponding to Thread 1), with all 32 KB also being allocated to the video channel 110a (demonstrated by the right-most memory block in the shared buffer 108 corresponding to the video channel 110a).

Thread 2 corresponds to the overlay manager 112b and display peripheral 116b, and includes the video channels 110b and 110c. Thread 2 is shown as being allocated 96 KB of the shared buffer 108 (demonstrated by the left-most memory block in the shared buffer 108 corresponding to Thread 2), with 64 KB being allocated to the video channel 110b and 32 KB being allocated to the video channel 110c (demonstrated by the right-most memory blocks in the shared buffer 108 corresponding to the video channels 110b and 110c).

Thread 3 corresponds to the overlay manager 112c and display peripheral 116c, and includes the video channel 110d. Thread 3 is shown as being allocated 32 KB of the shared buffer 108 (demonstrated by the left-most memory block in the shared buffer 108 corresponding to Thread 3), with 16 KB being allocated to the video channel 110d (demonstrated by the right-most memory block in the shared buffer 108 corresponding to the video channel 110d). As explained above, Thread 4 corresponds to the overlay manager 112d and display peripheral 116d but is not shown for simplicity. In this example, since no video channel is coupled to the overlay manager 112d, the display peripheral 116d does not display any content.

Figure 3:
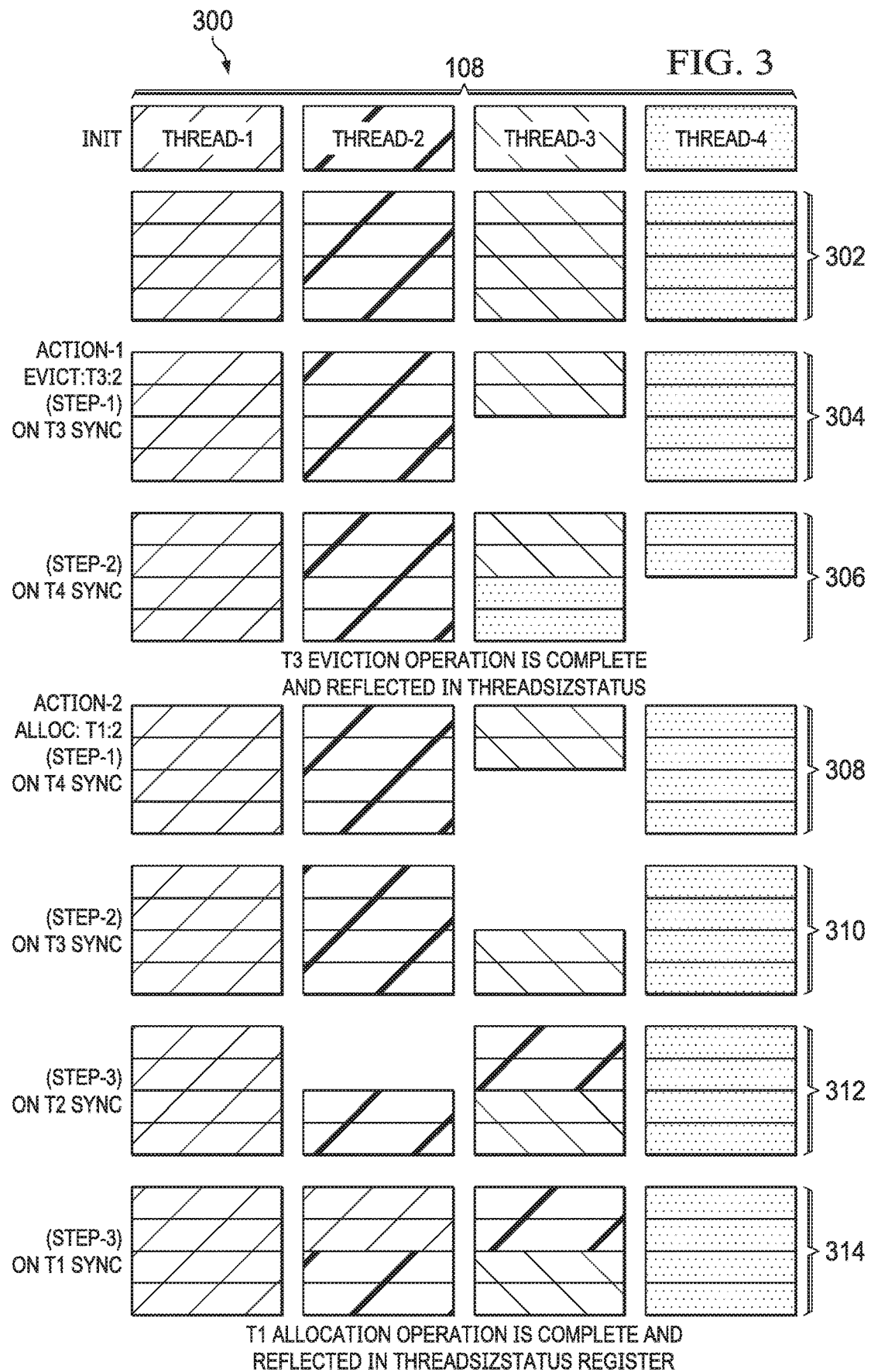
FIG. 3 shows an exemplary memory allocation process in accordance with various examples.

FIG. 3 shows a conceptual example 300 of the memory reallocation process that the DMA engine 106 carries out regarding the shared buffer 108. For now, the memory reallocation process is explained in conceptual terms. However, the specific interactions between the DMA engine 106, other display subsystem 102 hardware, the main processor 150, supervisory software 152, and the host processors 154a-154c will be explained in further detail below.

At a first step 302, the available memory in the shared buffer 108 is allocated to the different threads based on their display resolutions, which in this example are assumed to be identical. For simplicity, memory units are generically referred to as "blocks," which may be many various sizes in practice. Thus, each of Threads 1-4 is allocated 4 blocks (an exemplary value) in the shared buffer 108 upon initialization. In the example of FIG. 3, for demonstrative purposes, it is assumed that Thread 4 is allocated space in the shared buffer 108, although in FIG. 1 Thread 4 was omitted from the figure for purposes of simplicity.

It is noted that different display peripherals 116a-116d synchronize (e.g., end of a display frame) at different rates, and thus the corresponding synchronization events of their associated threads also differ. For purposes of simplicity, a thread "sync" refers to the occurrence of the synchronization event for that thread, or when a frame has been successfully displayed. The DMA engine 106 is aware of when a thread sync occurs for each thread, and thus also only causes a deallocation, allocation, and/or reallocation of memory in the shared buffer 108 upon the occurrence of a thread sync, so as to avoid corrupting the frame being displayed on a particular thread's associated display peripheral 116a-116d.

In the example of FIG. 3, it has been determined (e.g., by supervisory software 152 in response to a request from one or more host processors 154a-154c) that Thread 1 requires (or could benefit from, if available) 2 additional blocks of the shared buffer 108. It has also been determined that Thread 3 can afford to relinquish control over 2 blocks of the shared buffer 108. Once the determination has been made that the blocks requested by Thread 1 are available from Thread 3, the remaining steps of the example 300 relate to carrying out that transaction.

Prior to step 304, the DMA engine 106 has received a command (e.g., from supervisory software 152 in response to a request from one or more host processors 154a-154c) to deallocate 2 blocks from Thread 3. As a result, in step 304, the DMA engine 106, upon a Thread 3 sync, first deallocates or frees 2 blocks at the end of the allocated memory for Thread 3. For purposes of simplicity, reference is made to the "beginning" and "end" or moving blocks "forward" (toward the beginning) or "backward" (toward the end) of the memory space, although it should be appreciated that the schemes described herein could be implemented in reverse as well.

At step 306, upon a Thread 4 sync, the DMA engine 106 shifts the memory allocated to Thread 4 forward to be contiguous with the memory allocated to Thread 3 and to create a concatenated free space at the end of the shared buffer 108. Once the memory allocated to Threads 1-4 in the shared buffer 108 is contiguous, and thus the free space at the end of the shared buffer 108 is fully concatenated, the DMA engine 106 signals the completion of the deallocation operation. For example, the DMA engine 106 generates an indication such as an interrupt to the supervisory software 152, or an update to a thread status register accessible by the main processor 150 or that the supervisory software 152 monitors.

Once the supervisory software 152 is aware that the deallocation has been successfully carried out, the allocation of additional space to Thread 1 takes place. Thus, in step 308, the DMA engine 106 has received a command (e.g., from supervisory software 152 in response to a request from one or more host processors 154a-154c) to allocate 2 additional blocks to Thread 1. The DMA engine 106 responds by shifting the memory allocated to the other Threads 2-4 to create free space contiguous with Thread 1. As explained above, due to allocating space only upon a thread sync to avoid interruptions displaying frames, this shift occurs sequentially. For example, in step 308, upon a Thread 4 sync, the DMA engine 106 shifts the memory allocated to Thread 4 backward by the amount required to be allocated to Thread 1 (2 blocks in this example), which essentially shifts the free space forward from the end of the shared buffer 108.

Then, in step 310, upon a Thread 3 sync, the DMA engine 106 shifts the memory allocated to Thread 3 backward by the amount required to be allocated to Thread 1 (2 blocks in this example), which essentially shifts the free space forward from the end of the memory allocated to Thread 3.

Then, in step 312, upon a Thread 2 sync, the DMA engine 106 shifts the memory allocated to Thread 2 backward by the amount required to be allocated to Thread 1 (2 blocks in this example), which essentially shifts the free space forward from the end of the memory allocated to Thread 2.

Finally, in step 314, the free space is contiguous with the memory allocated to Thread 1. Further, had there been any remaining free space, such free space would still be concatenated at the end of the shared buffer 108, since allocated blocks were only shifted backward by the amount to be allocated to Thread 1. Thus, upon a Thread 1 sync, the DMA engine 106 allocates the free space to Thread 1. As above, once the memory allocated to Threads 1-4 in the shared buffer 108 is contiguous, and the free space (if any) at the end of the shared buffer 108 is fully concatenated, the DMA engine 106 signals the completion of the allocation operation. As above, the DMA engine 106 generates an indication such as an interrupt to the supervisory software 152, or an update to a thread status register accessible by the main processor 150 or that the supervisory software 152 monitors.

The above addresses an inter-thread reallocation process, which in some cases occurs across multiple frames in order to honor thread sync event timing and to ensure contiguousness of allocated space in the shared buffer 108. In addition, a host processor associated with a thread having more than one channel (e.g., host processor 154*b* and Thread 2) causes the DMA engine 106 re-allocate shared buffer 108 space between its channels (e.g., intra-thread reallocation) in a dynamic fashion. The host processor 154*b* controls the DMA engine 106 directly to perform intra-thread reallocation in some examples, while in other examples performs intra-thread reallocation by way of a request to the main processor 150 (which then controls the DMA engine 106).

As above, a channel "sync" refers to the occurrence of a synchronization event for that channel, or when a frame from the channel has been successfully displayed. However, all the channel sync events within a given thread occur at the same time, and so it is possible to change the allocation of shared buffer 108 space among channels within the thread in a single event. Further, in some examples the host processor 154*b* is aware of the total space in the shared buffer 108 allocated to Thread 2, and thus determines whether the reallocation is feasible. The main processor 150 and/or supervisory software 152 does not need to determine whether another Thread 1 or 3 can de-allocate the requested space for a channel reallocation within Thread 2. In an example, the host processor 154*b* controls the DMA engine 106 to carry out the intra-thread reallocation without involvement of the main processor 150. In another example, when the host processor 154*b* requests a change in allocated space between the two channels of Thread 2, the main processor 150 and/or the supervisory software causes the DMA engine 106 to reallocate space between the channels of Thread 2 upon the occurrence of a channel sync event, or a Thread 2 sync event.

Figure 4:
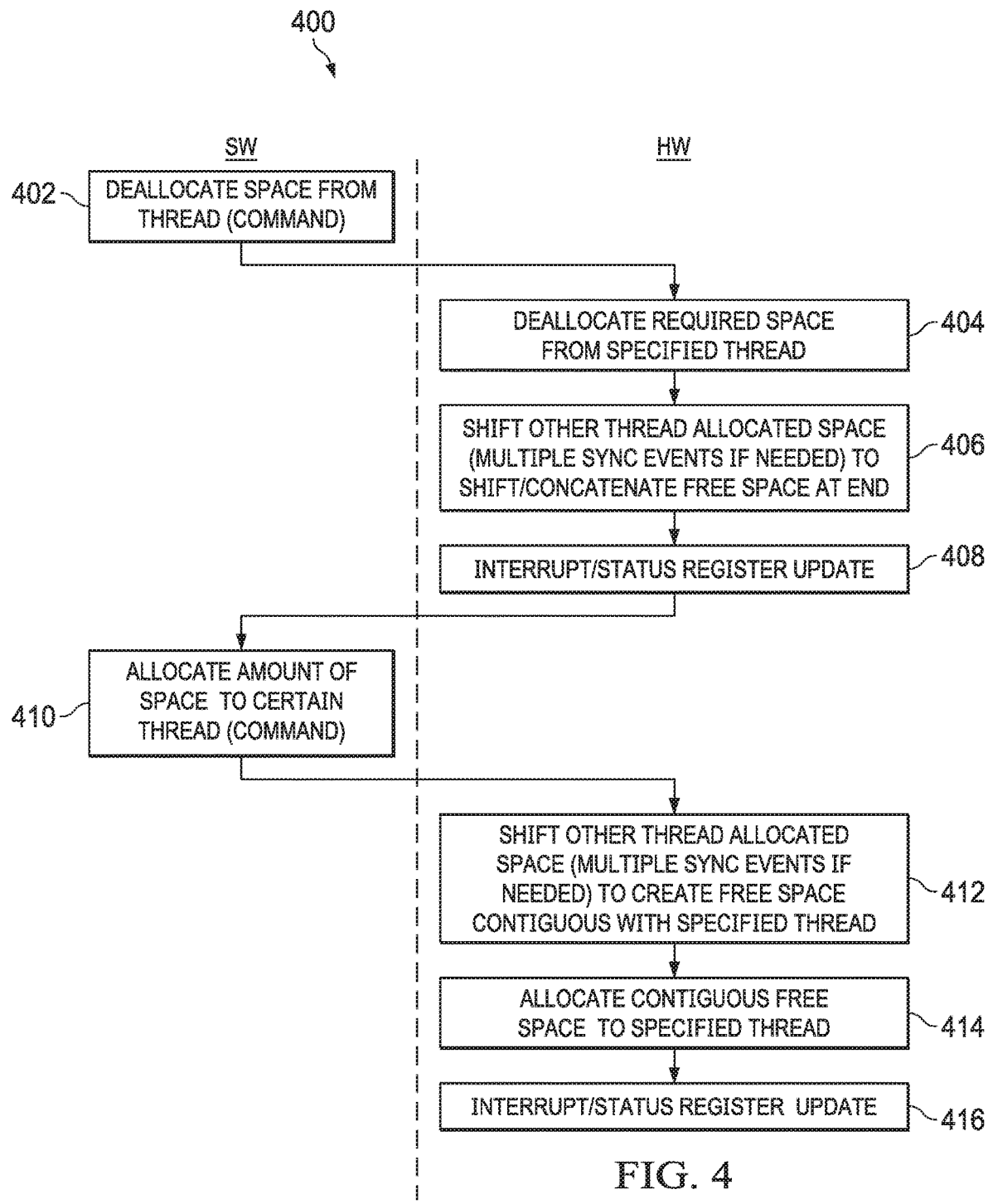
FIG. 4 shows a flow chart of a method in accordance with various examples.

FIG. 4 shows a flow chart of a method 400 that illustrates the relationship between supervisory software 152 and the main processor 150 (under the "software" portion) and the display subsystem 102 and more particularly the DMA engine 106 (under the "hardware" portion) in implementing the above inter- and intra-thread reallocation schemes for the shared buffer 108. The method 400 begins in block 402 where it is determined by the main processor 150 and/or supervisory software 152 to deallocate space in the shared buffer 108 from a thread (e.g., in response to a request from a host processor 154*a*-154*c* for deallocation or a request for allocation and a determination that another thread could afford to deallocate space). This causes the supervisory software 152, for example, to issue a command to the DMA engine 106 to deallocate a specified amount of space from a specified thread.

The method 400 continues in block 404 in which the DMA engine 106 deallocates the required space from the specified thread upon the occurrence of a thread sync event for that thread, for example as shown and explained above with reference to step 304 of FIG. 3. The DMA engine 106 updates one or more internal register values and memory pointers (e.g., a start pointer and an end pointer) to reflect the deallocated space from the specified thread.

In block 406, the DMA engine 106 shifts the allocated space for another thread such that the space freed by the deallocation in block 404 is consumed, and any free space is shifted or concatenated at the end of the shared buffer 108. The DMA engine 106 carries out the shift upon the occurrence of a thread sync event for the other thread. The block 406 may be repeated if more than one thread's allocated space needs to be shifted to consume the space freed by the deallocation in block 404, and the subsequent shifts take place on those thread's sync events, respectively.

Upon completion of shifting or concatenating free space at the end of the shared buffer 108 in block 406, the method 400 continues in block 408 with the DMA engine 106 generating an indication such as an interrupt to the supervisory software 152 or updating a thread status register accessible by the main processor 150 or monitored by the supervisory software 152 to indicate that the deallocation began in block 404 is complete.

If the above deallocation request in block 402 is generated in response to a request from a host processor 154*a*-154*c* for allocation and a determination that another thread could afford to deallocate space, the method 400 continues in block 410 with the supervisory software 152, for example, issuing a command to the DMA engine 106 to allocate a specified amount of space to a specified thread. If no allocation request is made by a host processor 154*a*-154*c*, then the method 400 ends after block 408.

The method 400 continues in block 412 in which the DMA engine 106 shifts the space allocated to another thread to create free space in the shared buffer 108 contiguous with the space allocated to the thread that requested the additional allocated space. As above, the shifts are carried upon the occurrence of a thread sync event for the thread having its allocated space shifted. Further, the block 412 may be repeated if more than one thread's allocated space needs to be shifted to free space contiguous with the thread that requested the additional allocated space, as shown and explained above with reference to steps 308-312 of FIG. 3.

Upon the completion of shifting the space allocated to other threads to create free space in the shared buffer 108 contiguous with the space allocated to the thread that requested the additional allocated space, the method 400 continues in block 414 in which the DMA engine 106 allocates the contiguous free space to the requesting thread. Upon completion of the allocation in block 414, the method 400 continues in block 416 with the DMA engine 106 generating an indication such as an interrupt to the supervisory software 152 or updating a thread status register accessible by the main processor 150 or monitored by the supervisory software 152 to indicate that the allocation began in block 412 is complete.

Throughout the method 400, the DMA engine 106 is aware of thread sync events for the various threads through communication with the timing generators 114a-114c. The DMA engine 106 is also aware of which channels are associated with which threads, and thus can associate a thread sync event with the channels of that thread as well. The allocations, deallocations, and shifts of allocated space described above all occur on one or across multiple thread sync events and thus the provision of video data to the display peripherals 116a-116d is maintained even during dynamic reallocation among threads or channels within a thread. Throughout the method 400, the DMA engine 106 carries out allocations, deallocations, and shifts as described by updating one or more internal register values and memory pointers (e.g., a start pointer and an end pointer) to reflect the changes in allocated space per thread.

Figure 5:
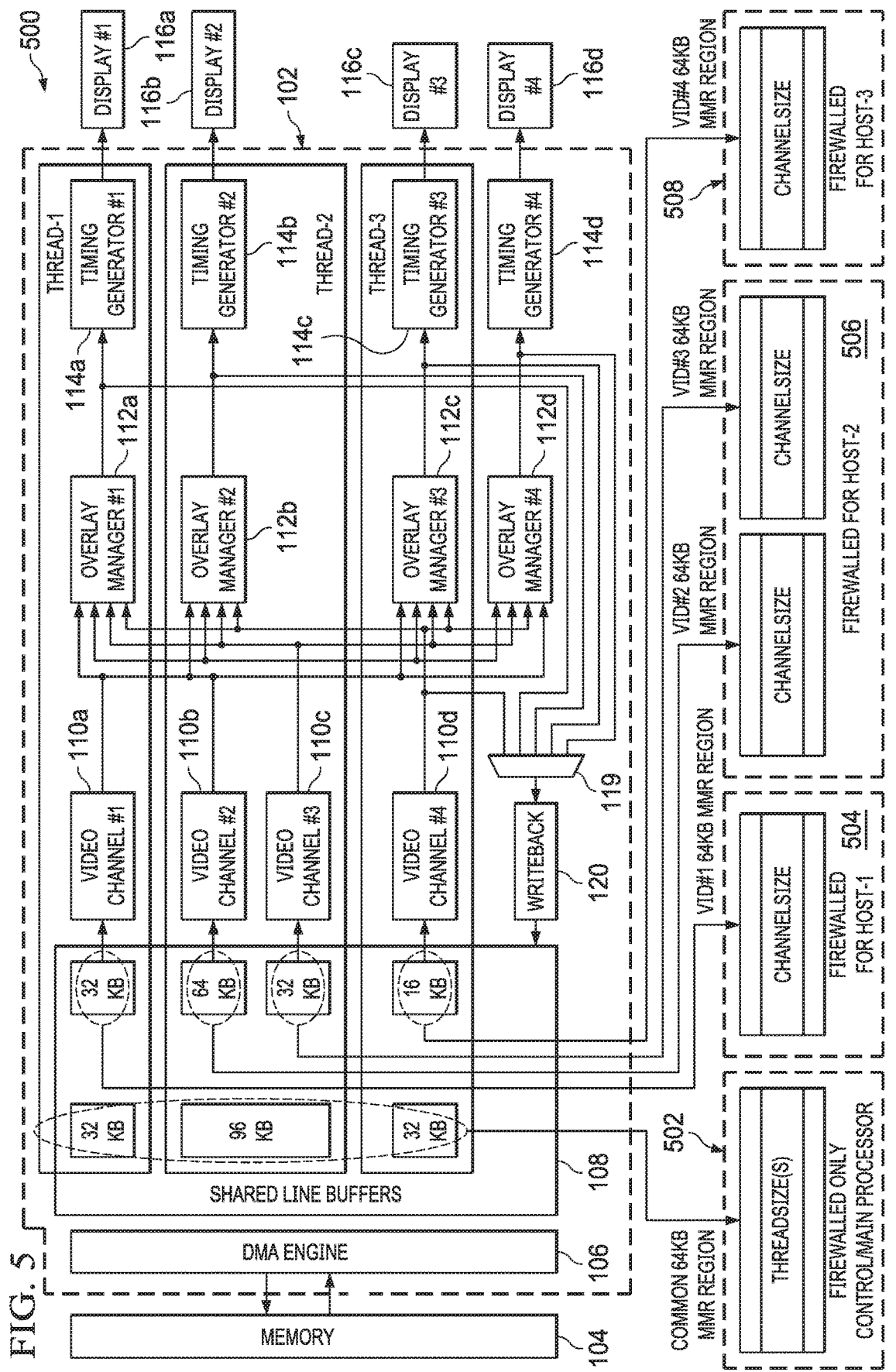
FIG. 5 shows the block diagram of FIG. 1 including additional safety and security access permissions in accordance with various examples.

FIG. 5 shows a system 500 with additional support for safety and security features regarding access to various registers that control configuration of threads and channels in the shared buffer 108, such as thread size, channel size, and start and/or end points of the allocated space in the shared buffer 108. In FIG. 5, elements having like reference numerals to those in FIG. 1 function in a like manner. For a multi-output display subsystem 102 as shown, each display peripheral 116a-116d is controlled by a different host processor 154a-154c or the main processor 150, each potentially having a different privilege level. In an automotive use-case, the display peripheral 116a is an instrumentation cluster display that is controlled by a safety-critical main processor 150 while the display peripheral 116b is a rear-seat entertainment display controlled by a general purpose host processor 154b.

In an example, shared buffer 108 space allocated to one thread should not be overwritten by another thread, as this could present a safety violation (e.g., overwriting safety-critical data sent to the instrumentation cluster 116a). Additionally, shared buffer 108 space allocated to one thread should not be read and displayed by another thread, as this could present a security violation.

To prevent safety and security violations, the different configuration registers are partitioned such that they are independently firewalled. Various memory mapped register (MMR) regions 502, 504, 506, 508 are coupled to the DMA engine 106. A common MMR region 502 contains the thread size registers for all of the threads (e.g., Threads 1-4 in this example). Individual MMR regions 504, 506, 508 are associated with each of the channels. Each individual MMR region 504, 506, 508 contains a channel size register. A thread that contains multiple channels can be considered as "owning," or being able to access and modify all of the associated channel MMR regions The DMA engine 106 or an external control module implements firewalls for both the common MMR region 502 and for each individual MMR region 504, 506, 508. In particular, access to the common MMR region 502 is only permitted for the main processor 150, while the other host processors 154a-154c are prevented from accessing the common MMR region 502. Thus, an inter-thread reallocation request from the host processors 154a-154c must be routed through the main processor 150 and its supervisory software 152 in order to carry out the reallocation. The host processors 154a-154c cannot directly request that the DMA engine 106 allocate more memory to its thread, or deallocate memory from another thread, and any such requests from the host processors 154a-154c are denied.

Similarly, access to each individual MMR region 504, 506, 508 is only permitted for the associated host processor 154a-154c and depends on the association of the channel or channels to the thread owned by the host processor 154a-154c and for the main processor 150. Unassociated host processors 154a-154c are not permitted to access another individual MMR region 504, 506, 508. For example, the individual MMR region 504 is associated with the host processor 154a. In this example, the host processor 154a and the main processor 150 are permitted to access the individual MMR region 504 while the host processors 154b, 154c are not permitted to access the individual MMR region 504. Thus, an intra-thread (channel-wise) reallocation request from the associated host processor 154a and the main processor 150 and its supervisory software 152 will be carried out. The other host processors 154b, 154c cannot alter the channel allocation of another thread, and any such requests from the host processors 154b, 154c in this example are denied.

In the foregoing discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system comprising:
a buffer including:
a first allocated portion associated with a first thread; and
a second allocated portion associated with a second thread; and
a direct memory access (DMA) engine coupled to the buffer, the DMA engine configured to:
in response to receiving a request to deallocate an amount of space from the first allocated portion of the buffer:
deallocate the amount of space from the first allocated portion of the buffer, to produce deallocated space; and
shift, by updating one of a register value and a buffer pointer, the deallocated space to a fourth allocated portion within the buffer, the fourth allocated portion unassociated with the first thread and the second thread.

2. The system of claim 1, wherein the buffer further comprises a third allocated portion associated with a third thread, and the DMA engine is further configured to, in response to receiving the request to deallocate the amount of space from the first allocated portion of the buffer, shift the third allocated portion of the buffer.

3. The system of claim 2, wherein the request is a first request, wherein the DMA engine is further configured to:
receive a second request to allocate an additional amount of space to the second allocated portion; and
in response to receiving the second request:
shift the third allocated portion, to produce free space; and
allocate the free space to the second allocated portion.

4. The system of claim 1, wherein the first thread is associated with a first display peripheral and the second thread is associated with a second display peripheral.

5. The system of claim 1, wherein shifting the second allocated portion of the buffer maintains contiguity of allocated portions of the buffer and concatenates free space at an end of the buffer.

6. The system of claim 5, wherein the DMA engine is further configured to generate an indication when contiguity of the allocated portions is established after deallocating the amount of space.

7. The system of claim 6, wherein the indication comprises an interrupt to a processor.

8. The system of claim 6, wherein the indication comprises a change to a register value accessible by a processor.

9. The system of claim 1, wherein the DMA engine is configured to deallocate the amount of space from the first allocated portion upon a sync event for the first thread.

10. The system of claim 1, wherein the second thread comprises a first channel and a second channel that share the second allocated portion, wherein the amount of space is a first amount of space, wherein the request is a first request, and wherein the DMA engine is further configured to:
receive a second request from a main processor or a host processor associated with the second thread to deallocate a second amount of space from the first channel and allocate the second amount of space to the second channel; and
in response to receiving the second request, deallocate the second amount of space from the first channel and allocate the second amount of space to the second channel upon a sync event for the second thread.

11. The system of claim 10, wherein in response to receiving a third request from a processor other than the main processor or the host processor associated with the second thread to deallocate the amount of space from the first channel and allocate the amount of space to the second channel, the DMA engine is further configured to deny the request.

12. The system of claim 1, wherein the request is a first request, wherein in response to receiving a second request from a processor other than a main processor to deallocate from or allocate to an allocated portion associated with a display thread, the DMA engine is further configured to deny the second request.

13. A vehicle, comprising:
a display subsystem, comprising:
a buffer comprising:
a first allocated portion associated with a first thread; and
a second allocated portion associated with a second thread; and
a direct memory access (DMA) engine coupled to the buffer, the DMA engine configured to:
in response to receiving a request to deallocate an amount of space from the first allocated portion of the buffer:
deallocate the amount of space from the first allocated portion of the buffer, to produce deallocated space; and
shift, by updating one of a register value and a buffer pointer, the deallocated space to a third allocated portion within the buffer, wherein the third allocated portion is unassociated with the first thread and the second thread;
a first display peripheral coupled to the display subsystem, the first display peripheral configured to display the first thread; and
a second display peripheral coupled to the display subsystem, the second display peripheral configured to display the second thread.

14. The vehicle of claim 13, further comprising a memory coupled to the DMA engine, wherein the DMA engine is further configured to read display content for the first thread and the second thread from the memory.

15. The vehicle of claim 13, further comprising:
a first processor coupled to the display subsystem;
a second processor coupled to the first processor and to the display subsystem; and
a third processor coupled to the first processor and to the display subsystem.

16. The vehicle of claim 15, wherein the first processor is a safety-critical processor, the second processor and the third processor are general purpose processors.

17. The vehicle of claim 13, wherein the first display peripheral has a first frame rate and the second display peripheral has a second frame rate, wherein the first frame rate is less than the second frame rate.

18. The vehicle of claim 13, the display subsystem further comprising:
a first video channel coupled to the buffer, the first video channel configured to process the first thread; and
a second video channel coupled to the buffer, the second video channel configured to process the second thread.

19. The vehicle of claim 18, the display subsystem further comprising:
a first overlay manager coupled to the first video channel; and
a second overlay manager coupled to the second video channel.

20. A system comprising:
a buffer comprising:
   a first allocated portion associated with a first thread; and
   a second allocated portion associated with a second thread; and
a direct memory access (DMA) engine coupled to the buffer, the DMA engine configured to:
   in response to receiving a request to allocate an additional amount of space to the second allocated portion:
      shift, by updating one of a first register value and a first buffer pointer, the first allocated portion, to produce free space;
      shift, by updating one of a second register value and a second buffer pointer, the free space to a third allocated portion within the buffer, wherein the third allocated portion is unassociated with the first thread and the second thread; and
      allocate at least a portion of the free space to the second allocated portion.

\* \* \* \* \*